United States Patent
Taniguchi

(10) Patent No.: US 11,505,194 B2
(45) Date of Patent: Nov. 22, 2022

(54) VEHICLE TRAVEL CONTROL METHOD AND TRAVEL CONTROL DEVICE

(71) Applicant: Nissan Motor Co., Ltd., Yokohama (JP)

(72) Inventor: Yohei Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/609,833

(22) PCT Filed: May 15, 2019

(86) PCT No.: PCT/JP2019/019390
§ 371 (c)(1),
(2) Date: Nov. 9, 2021

(87) PCT Pub. No.: WO2020/230304
PCT Pub. Date: Nov. 19, 2020

(65) Prior Publication Data
US 2022/0203993 A1    Jun. 30, 2022

(51) Int. Cl.
*B60W 30/18*    (2012.01)
(52) U.S. Cl.
CPC ... *B60W 30/18163* (2013.01); *B60W 2540/20* (2013.01); *B60W 2540/215* (2020.02); *B60W 2554/4042* (2020.02)
(58) Field of Classification Search
CPC ..... B60W 30/18163; B60W 2540/215; B60W 2554/4042; B60W 2540/20
See application file for complete search history.

(56) References Cited

U.S. PATENT DOCUMENTS

| | | | |
|---|---|---|---|
| 6,577,334 | B1 | 6/2003 | Kawai et al. |
| 2018/0118223 | A1 | 5/2018 | Mori et al. |
| 2018/0154939 | A1 | 6/2018 | Aoki |
| 2019/0071099 | A1 | 3/2019 | Nishiguchi |

(Continued)

FOREIGN PATENT DOCUMENTS

| | | | |
|---|---|---|---|
| JP | 2000-105898 A | | 4/2000 |
| JP | 2002-154451 A | | 5/2002 |

(Continued)

*Primary Examiner* — Michael D Lang
(74) *Attorney, Agent, or Firm* — Young Basile Hanlon & MacFarlane, P.C.

(57) ABSTRACT

A system trigger mode and a driver trigger mode are provided. In the system trigger mode, when a start condition for an automated lane change function of performing a lane change of a vehicle by autonomous travel control is satisfied, lane change information as to whether or not to accept execution of the automated lane change function is presented, and when an acceptance input of accepting the execution of the automated lane change function is detected in response to presentation of the lane change information, the automated lane change function is executed. In the driver trigger mode, the automated lane change function is executed when a lane change instruction operation different from the acceptance input is performed. When the lane change instruction operation is performed after the presentation of the lane change information, the automated lane change function by the driver trigger mode is executed.

6 Claims, 9 Drawing Sheets

(56) References Cited

U.S. PATENT DOCUMENTS

2020/0094838 A1\* 3/2020 Nishimura ........... G05D 1/0061
2020/0331530 A1 10/2020 Aoki

FOREIGN PATENT DOCUMENTS

| JP | 2016-071514 A | 5/2016 |
| JP | 2016-197390 A | 11/2016 |
| JP | 2018-030479 A | 3/2018 |
| JP | 2018-092538 A | 6/2018 |
| JP | 2019-043432 A | 3/2019 |

\* cited by examiner

VEHICLE TRAVEL CONTROL METHOD AND TRAVEL CONTROL DEVICE

TECHNICAL FIELD

The present invention relates to a travel control method and a travel control apparatus for a vehicle that include autonomous travel control.

BACKGROUND

An automated driving system equipped in a vehicle is known, in which when a lane change is proposed to the driver, he/she can indicate disagreement with the lane change by a blinker operation in the direction opposite to the proposed direction (JP2016-071514A).

SUMMARY

According to the above prior art, however, if the driver operates the blinker with the intention of performing a lane change in the direction opposite to the proposed direction, the lane change itself will be canceled.

A problem to be solved by the present invention is to provide a travel control method and a travel control apparatus for a vehicle that are able to reliably reflect the driver's request for a lane change.

The present invention includes providing a travel control method for a vehicle having a system trigger mode and a driver trigger mode, the system trigger mode being a mode in which a lane change proposed from an autonomous travel control system of the vehicle is executed by autonomous travel control using an automated lane change function, the driver trigger mode being a mode in which a lane change instructed from a driver of the vehicle is executed using the automated lane change function, wherein when the lane change instruction operation by the driver is detected after the lane change information as to whether or not the lane change is executed is presented in the system trigger mode, the driver trigger mode is used to execute the lane change instructed by the lane change instruction operation.

According to the present invention, when the driver performs the lane change instruction operation after the presentation of the lane change information, the automated lane change function is executed by the driver trigger mode, and the driver's intention to change lanes can therefore be reflected.

DETAILED DESCRIPTION

Figure 1:
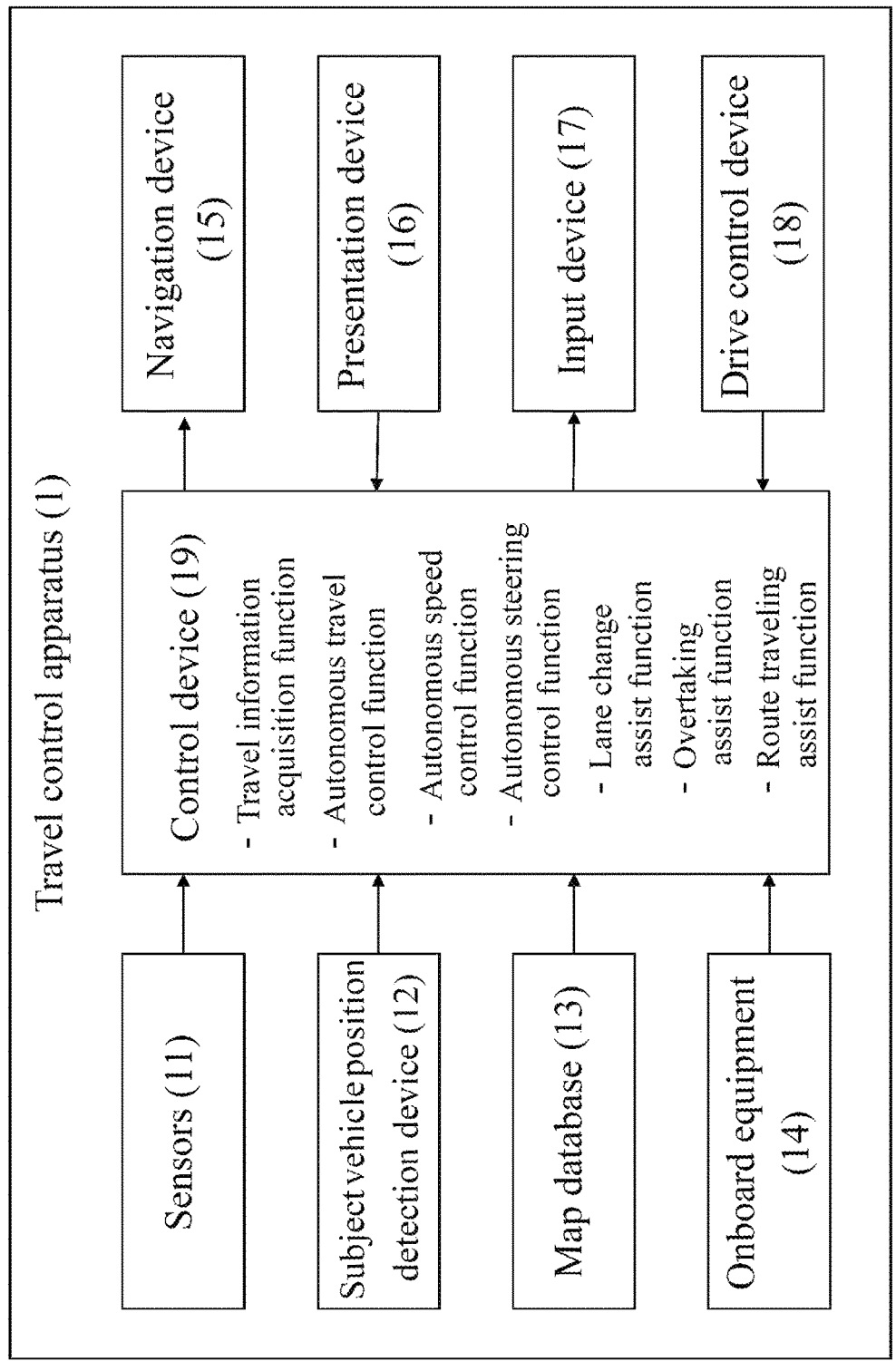
FIG. 1 is a block diagram illustrating an embodiment of the travel control apparatus for a vehicle according to the present invention.

FIG. 1 is a block diagram illustrating the configuration of a travel control apparatus 1 for a vehicle (also referred to as a "subject vehicle," hereinafter) according to an embodiment of the present invention. The travel control apparatus 1 for a vehicle according to the present embodiment represents an embodiment for carrying out the travel control method for a vehicle according to the present invention. As illustrated in FIG. 1, the travel control apparatus 1 for a vehicle according to the present embodiment includes sensors 11, a subject vehicle position detection device 12, a map database 13, onboard equipment 14, a navigation device 15, a presentation device 16, an input device 17, a drive control device 18, and a control device 19. These devices are connected to one another, for example, via a controller area network (CAN) or other onboard LAN for mutually exchanging information.

The sensors 11 detect a traveling state of the subject vehicle. The sensors 11 include, for example, cameras such as a front camera that captures images ahead of the subject vehicle, a rear camera that captures images behind the subject vehicle, and side cameras that capture images on the right and left sides of the subject vehicle. Additionally or alternatively, the sensors 11 include radar devices such as a front radar that detects obstacles ahead of the subject vehicle, a rear radar that detects obstacles behind the subject vehicle, and side radars that detect obstacles existing on the right and left sides of the subject vehicle. Additionally or alternatively, the sensors 11 include a vehicle speed sensor that detects the vehicle speed of the subject vehicle, a touch sensor (capacitance sensor) that detects the holding of the steering wheel by the driver, a driver monitor that captures images of the driver, etc. The sensors 11 may be represented by one of the above-described various sensors or may also be configured as a combination of two or more sensors. The detection results of the sensors 11 are output to the control device 19 at predetermined time intervals.

The subject vehicle position detection device 12 includes a GPS unit, a gyro-sensor, a vehicle speed sensor, etc. The subject vehicle position detection device 12 detects radio waves transmitted from a plurality of communication satellites using the GPS unit to periodically acquire the positional information of a target vehicle (subject vehicle). In addition, the subject vehicle position detection device 12 detects the current position of the target vehicle based on the acquired positional information of the target vehicle, angle variation information acquired from the gyro-sensor, and the vehicle speed acquired from the vehicle speed sensor. The subject vehicle position detection device 12 outputs the detected positional information of the target vehicle to the control device 19 at predetermined time intervals.

The map database 13 is a memory that stores three-dimensional high-precision map information including positional information of various facilities and specific points and is accessible from the control device 19. The three-dimensional high-precision map information is three-dimensional map information based on the road shape detected when traveling on an actual road using a vehicle for data acquisition. The three-dimensional high-precision map information is map information in which detailed and highly precise positional information items, such as a curved road and the size of the curve (e.g., curvature or radius of curvature), a merging point and a branching point of a road, a tollgate, and a position at which the number of lanes is reduced, are associated with the map information as the three-dimensional information.

The onboard equipment 14 includes various modules equipped in the vehicle and is operated by the driver. Examples of such onboard equipment include a steering wheel, an accelerator pedal, a brake pedal, direction indicators, wipers, lights, a horn, and other specific switches. When the driver operates the onboard equipment 14, its operation information is output to the control device 19.

The navigation device 15 acquires the current positional information of the subject vehicle from the subject vehicle position detection device 12 and superimposes the position of the subject vehicle on the map information for navigation to display the position of the subject vehicle and the map information on a display or the like. In addition, the navigation device 15 has a navigation function of setting a route to a destination and guiding the set route to the driver when the destination is set. This navigation function serves to display the route on the map of the display and inform the driver of the route by voice or the like. The route set by the navigation device 15 is also used in a route traveling assist function of the control device 19. The route traveling assist function is a function used for controlling the subject vehicle to autonomously travel to the destination based on the set route.

The presentation device 16 includes, for example, one or more displays such as a display of the navigation device 15, a display incorporated in a rearview mirror, a display incorporated in a meter unit, and a head-up display projected on a windshield. Additionally or alternatively, the presentation device 16 includes one or more devices other than the displays, such as a speaker of an audio device and a seat device with embedded vibrating bodies. The presentation device 16 informs the driver of various presentation information items under the control by the control device 19.

Figure 2:
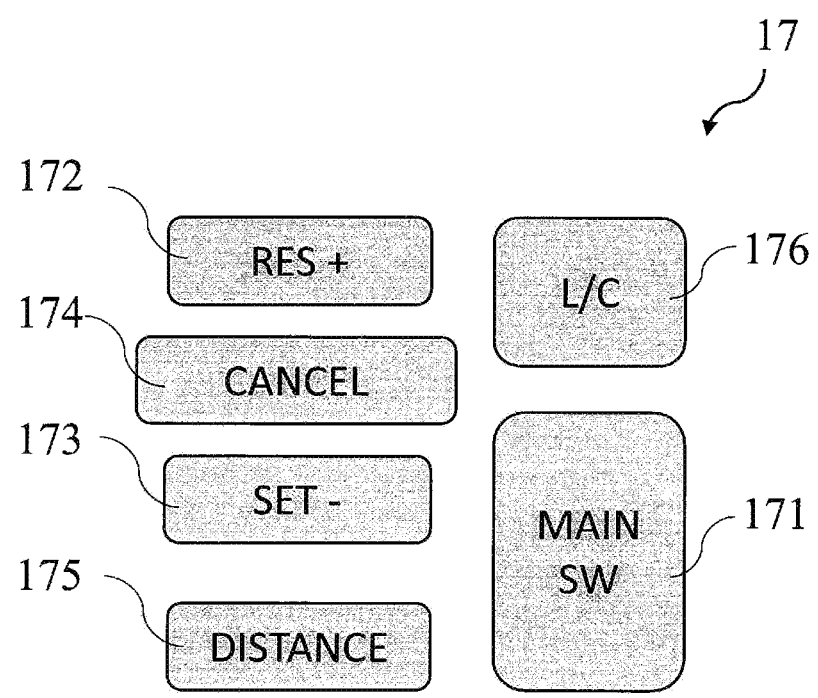
FIG. 2 is a front view illustrating a part of the input device of FIG. 1.

The input device 17 is, for example, a device such as a button switch or a touch panel disposed on a display screen with which the driver can input information by the manual operation or a microphone with which the driver can input information by the voice. In the present embodiment, the driver can operate the input device 17 thereby to input setting information in response to the presentation information which is presented by the presentation device 16. FIG. 2 is a front view illustrating a part of the input device 17 of the present embodiment and represents an example including a set of button switches arranged on a spoke part or the like of the steering wheel. The illustrated input device 17 is a button switch used when setting ON/OFF or the like of the autonomous travel control function (autonomous speed control function and autonomous steering control function) of the control device 19. The input device 17 includes a main switch (MAIN SW) 171, a resume/acceleration switch (RES+) 172, a set/coast switch (SET−) 173, a cancel switch (CANCEL) 174, an inter-vehicle distance adjustment switch (DISTANCE) 175, and a lane change assist switch (L/C) 176.

The main switch 171 is a switch for turning ON/OFF the power source of the system which achieves the autonomous speed control function and autonomous steering control function of the control device 19. The resume/acceleration switch 172 is a switch for turning OFF the operation of the autonomous speed control function and then resuming the autonomous speed control function at the set speed before the OFF state, for increasing the set speed, and/or for following a preceding vehicle to stop and then restarting. The set/coast switch 173 is a switch for starting the autonomous speed control function at the speed when traveling and/or lowering the set speed. The cancel switch 174 is a switch for turning OFF the autonomous speed control function. The inter-vehicle distance adjustment switch 175 is a switch for setting the inter-vehicle distance from a preceding vehicle and is, for example, a switch for selecting one from a plurality of stages of settings such as short distance/medium distance/long distance. The lane change assist switch 176 is a switch for instructing (accepting) the start of a lane change when the control device 19 confirms the start of the lane change with the driver. By operating the lane change assist switch 176 for a longer time than a predetermined time after accepting the start of the lane change, the acceptance of the lane change proposed by the control device 19 can be revoked.

Additionally or alternatively to the set of button switches illustrated in FIG. 2, a direction indicator lever for the direction indicators or a switch of other onboard equipment 14 can be used as the input device 17. For example, in a case in which the control device 19 proposes whether or not to automatically change lanes, when the driver operates the direction indicator lever, the lane change is performed toward the direction in which the direction indicator lever is operated, rather than the proposed lane change. The input device 17 outputs the input setting information to the control device 19.

The drive control device 18 controls travel of the subject vehicle. For example, when the subject vehicle travels at a constant set speed using the autonomous speed control function, the drive control device 18 controls the operation of the drive mechanism and the brake operation for achieving the acceleration/deceleration and the traveling speed so that the speed of the subject vehicle becomes the set speed. Additionally or alternatively, also when the subject vehicle travels to follow a preceding vehicle using the autonomous speed control function, the drive control device 18 controls the operations of the drive mechanism and brake in a similar manner to the above. The control of the operation of the drive mechanism includes controlling the operation of an internal-combustion engine in the case of an engine car and controlling the operation of an electric motor for travel in the case of an electric car. In the case of a hybrid car, the control of the operation of the drive mechanism includes controlling the torque distribution for an internal-combustion engine and an electric motor for travel.

The drive control device 18 controls the operation of the steering actuator using the autonomous steering control function in addition to the above-described control of the operations of the drive mechanism and brake and thereby executes the steering control of the subject vehicle. For example, when executing the lane keeping control using the autonomous steering control function, the drive control device 18 detects lane marks of a subject vehicle lane for the subject vehicle to travel and controls the traveling position of the subject vehicle in the road width direction so that the subject vehicle travels at a certain position in the subject vehicle lane. Additionally or alternatively, when executing a lane change assist function, overtaking assist function, or route traveling assist function, which will be described later, using the autonomous steering control function, the drive control device 18 controls the traveling position of the subject vehicle in the road width direction so that the subject vehicle changes lanes. Additionally or alternatively, when executing a right or left turn assist function using the autonomous steering control function, the drive control device 18 performs the travel control of turning right or left at an intersection or the like. The drive control device 18 controls the travel of the subject vehicle in accordance with commands from the control device 19, which will be described below. Any of other known methods can also be used as the travel control method executed by the drive control device 18.

The control device 19 includes a read only memory (ROM) that stores programs for controlling the travel of the subject vehicle, a central processing unit (CPU) that executes the programs stored in the ROM, a random access memory (RAM) that serves as an accessible storage device, etc. As substitute for or in addition to the CPU, a micro processing unit (MPU), a digital signal processor (DSP), an application specific integrated circuit (ASIC), a field programmable gate array (FPGA), or the like can be used as the operation circuit.

The control device 19 executes the programs stored in the ROM using the CPU thereby to achieve a travel information acquisition function of acquiring information regarding a traveling state of the subject vehicle and an autonomous travel control function of autonomously controlling the traveling speed and/or steering of the subject vehicle. The travel information acquisition function of the control device 19 is a function used for acquiring the travel information regarding the traveling state of the subject vehicle. For example, the control device 19 uses the travel information acquisition function to acquire as the travel information the external image information around the vehicle captured by the front camera, rear camera, and side cameras included in the sensors 11. Additionally or alternatively, the control device 19 uses the travel information acquisition function to acquire as the travel information the detection results by the front radar, rear radar, and side radars included in the sensors 11. Additionally or alternatively, the control device 19 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 19 uses the travel information acquisition function to acquire as the travel information the current positional information of the subject vehicle from the subject vehicle position detection device 12. Additionally or alternatively, the control device 19 uses the travel information acquisition function to acquire as the travel information the set destination and the route to the destination from the navigation device 15. Additionally or alternatively, the control device 19 uses the travel information acquisition function to acquire as the travel information the positional information of curved roads and the size of the curve (e.g., curvature or radius of curvature), merging points, branching points, tollgates, positions at which the number of lanes decreases, etc. from the map database 13. In addition, the control device 19 uses the travel information acquisition function to acquire as the travel information the information on an operation of the onboard equipment 14 performed by the driver from the onboard equipment 14.

The autonomous travel control function of the control device 19 is a function used for autonomously controlling the travel of the subject vehicle without depending on the driver's operation. The autonomous travel control function of the control device 19 includes an autonomous speed control function used for autonomously controlling the traveling speed of the subject vehicle and an autonomous steering control function used for autonomously controlling the steering of the subject vehicle. The autonomous speed control function and autonomous steering control function of the present embodiment will be described below.

«Autonomous Speed Control Function»

The autonomous speed control function is a function used, when detecting a preceding vehicle, for traveling to follow the preceding vehicle while performing the inter-vehicle distance control so as to maintain the inter-vehicle distance in accordance with the vehicle speed with an upper limit of the vehicle speed that is set by the driver. On the other hand, when no preceding vehicle is detected, the autonomous speed control function is used for performing constant speed traveling at a vehicle speed that is set by the driver. The former is also referred to as inter-vehicle distance control while the latter is also referred to as constant speed control. The autonomous speed control function may include a function of detecting the speed limit of a traveling road from a road sign using the sensors 11, or acquiring the speed limit from the map information of the map database 13, to automatically set the speed limit to a set vehicle speed.

To activate the autonomous speed control function, the driver first operates the resume/acceleration switch 172 or set/coast switch 173 of the input device 17 illustrated in FIG. 2 to input a desired traveling speed. For example, when the set/coast switch 173 is pressed while the subject vehicle is traveling at 70 km/h, the current traveling speed is set without any modification, but if the speed desired by the driver is 80 km/h, the resume/acceleration switch 172 may be pressed a plurality of times to increase the set speed. On the contrary, if the speed desired by the driver is 60 km/h, the set/coast switch 173 may be pressed a plurality of times to decrease the set speed. The inter-vehicle distance desired by the driver may be selected, for example, from a plurality of stages of settings such as short distance/medium distance/ long distance by operating the inter-vehicle distance adjustment switch 175 of the input device 17 illustrated in FIG. 2.

The constant speed control is executed when the front radar or the like of the sensors 11 detects no preceding vehicle ahead of the subject vehicle in its lane. In the constant speed control, the drive control device 18 controls the operation of the drive mechanism such as the engine and the brake while feeding back the vehicle speed data obtained by the vehicle speed sensor so as to maintain the set traveling speed.

The inter-vehicle distance control is executed when the front radar or the like of the sensors 11 detects a preceding vehicle ahead of the subject vehicle in its lane. In the inter-vehicle distance control, the drive control device 18 controls the operation of the drive mechanism such as the engine and the brake while feeding back the inter-vehicle distance data detected by the front radar so as to maintain the set inter-vehicle distance with an upper limit of the vehicle speed that is set by the driver. If the preceding vehicle stops while the subject vehicle is traveling under the inter-vehicle distance control, the subject vehicle also stops following the preceding vehicle. Additionally or alternatively, if the preceding vehicle starts within 30 seconds after the subject vehicle stops, the subject vehicle also starts traveling to follow the preceding vehicle again by the inter-vehicle distance control. If the subject vehicle stops for more than 30 seconds, the subject vehicle does not start in an automated or autonomous manner even when the preceding vehicle starts, and after the preceding vehicle starts, the subject vehicle starts traveling to follow the preceding vehicle again by the inter-vehicle distance control when the resume/acceleration switch 172 is pressed or the accelerator pedal is depressed.

《Autonomous Steering Control Function》

The autonomous steering control function is a function used, when a predetermined condition is satisfied during the execution of the above-described autonomous speed control function, for controlling the operation of the steering actuator thereby to execute the steering control of the subject vehicle. This autonomous steering control function includes, for example, a lane keeping function, a lane change assist function, an overtaking assist function, a route traveling assist function, and other functions. The lane keeping function is a function used for controlling the steering actuator so as to travel near the center of the lane, for example, to assist the driver's steering operation. The lane keeping function is also referred to as a lane width direction maintaining function or the like.

《Lane Change Assist Function》

Figure 3:
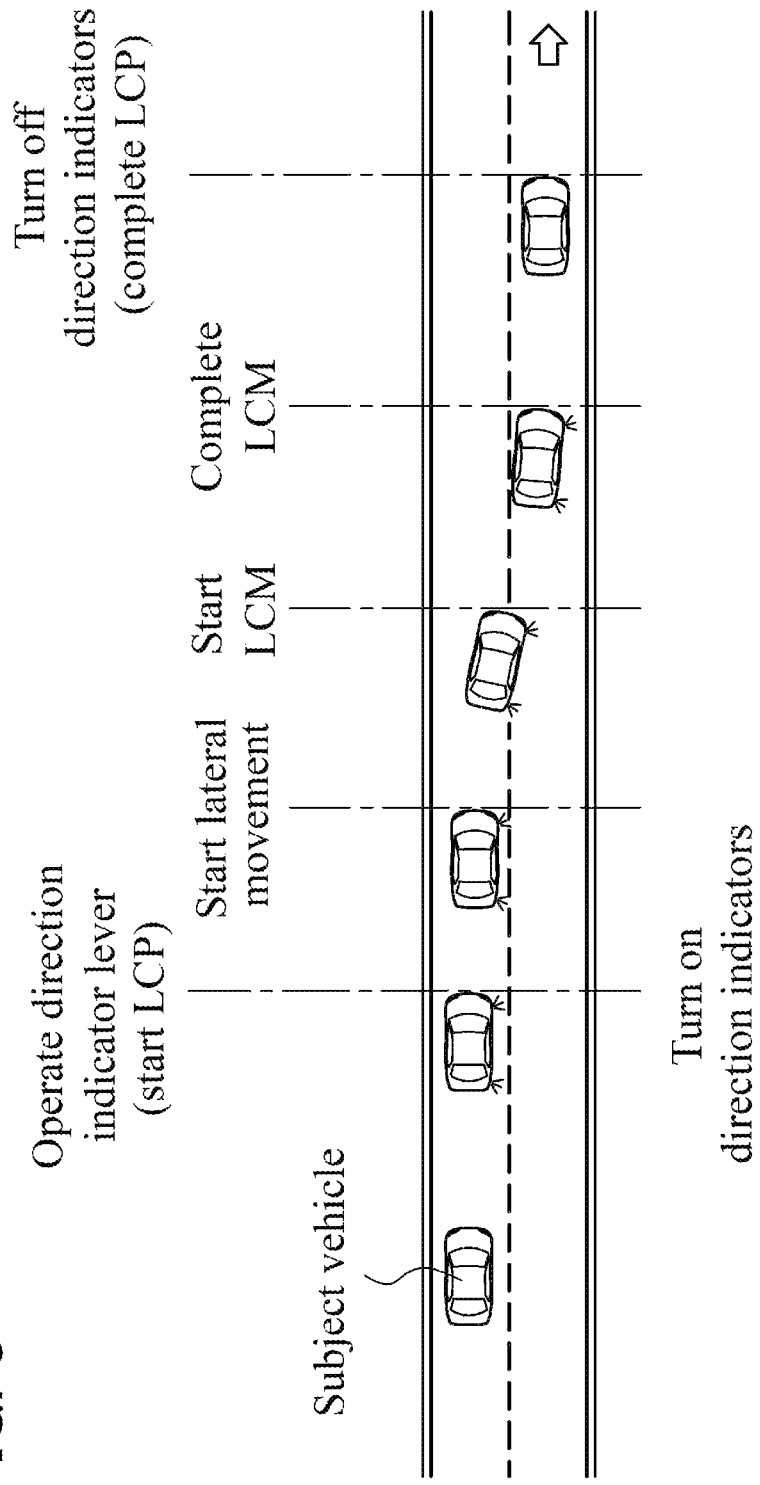
FIG. 3 is a plan view illustrating automated (autonomous) lane change control using a lane change assist function.

The lane change assist function serves to turn on the direction indicators when the driver operates the direction indicator lever, as illustrated in FIG. 3, and also serves to start a lane change performance (abbreviated as LCP, hereinafter) that is a series of processes for the automated or autonomous lane change when a preliminarily set lane change start condition is satisfied. The lane change assist function is used for determining whether or not the lane change start condition is satisfied, based on various travel information items acquired using the travel information acquisition function. Examples of the lane change start condition include, but are not limited to, a condition in which all of the following conditions are satisfied:

The lane keeping mode is carried out in a hands-on mode;
Hands-on determination is made;
The vehicle is traveling at a speed of 60 km/h or more;
There is a lane in the lane change direction;
The lane as the lane change destination includes a space to which a lane change is possible;
The type of lane markers indicates that a lane change is permitted;
The radius of curvature of the road is 250 m or more; and
The elapsed time after the driver operates the direction indicator lever is within one second.

The lane keeping mode in the hands-on mode, which will be described later in detail, refers to a state in which the autonomous speed control function and the lane keeping function of the autonomous steering control function are being executed and the holding of the steering wheel by the driver is detected. The hands-on determination being made refers to a state in which the driver continues to hold the steering wheel.

The lane change assist function is used for starting the LCP when the lane change start condition is satisfied. The LCP includes lateral movement of the subject vehicle to an adjacent lane and lane change maneuver (abbreviated as LCM, hereinafter) for actually moving to the adjacent lane. During the execution of the LCP, the lane change assist function serves to control the presentation device 16 to present the driver with information indicating that the lane change is performed in an automated or autonomous manner and also serves to call attention to the surroundings. When the LCM is completed, the lane change assist function is used for turning off the direction indicators and starting the execution of the lane keeping function in the adjacent lane.

《Overtaking Assist Function》

Figure 4:
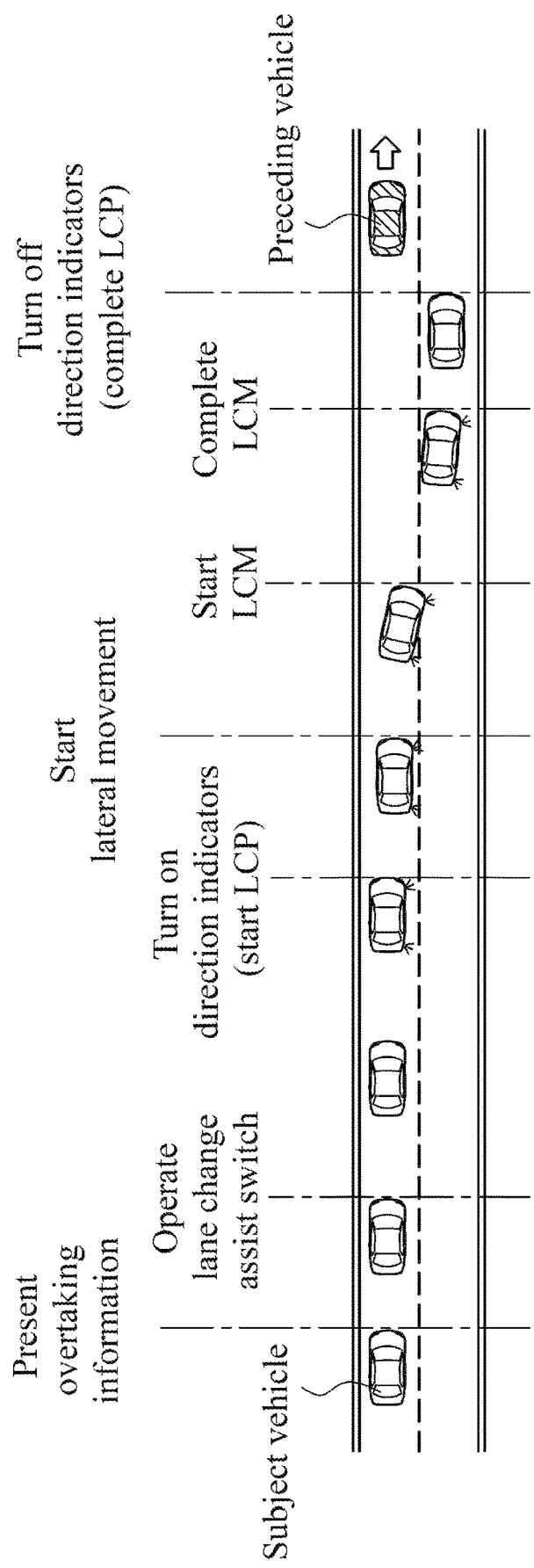
FIG. 4 is a plan view illustrating automated (autonomous) lane change control to an adjacent lane using an overtaking assist function.
Figure 5:
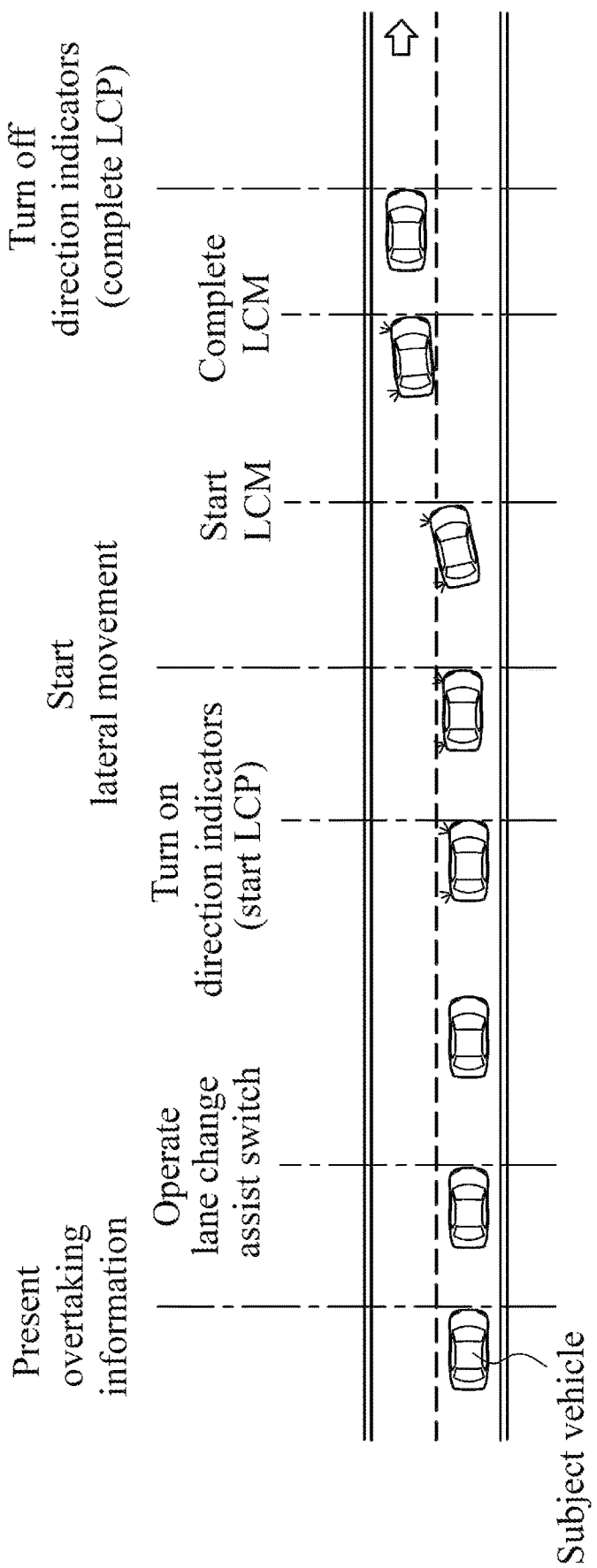
FIG. 5 is a plan view illustrating automated (autonomous) lane change control to the original travel lane using the lane change assist function.

The overtaking assist function is used for controlling the presentation device 16 to present the driver with overtaking information when a preceding vehicle slower than the subject vehicle is present ahead of the subject vehicle in its lane, as illustrated in FIG. 4, and a predetermined overtaking proposal condition that is preliminarily set is satisfied. Here, the overtaking information refers to information for proposing to overtake a preceding vehicle to the driver. The overtaking assist function serves to start the above-described LCP when the driver operates the lane change assist switch 176 of the input device 17 for acceptance (corresponding to the acceptance input) in response to the presentation of the overtaking information and an overtaking start condition that is preliminarily set is satisfied. The overtaking assist function serves to determine, based on various travel information items acquired using the travel information acquisition function, whether or not the overtaking proposal condition and the overtaking start condition are satisfied.

Examples of the overtaking proposal condition include, but are not limited to, a condition in which all of the following conditions are satisfied:

The lane keeping mode is carried out in a hands-off mode;
The vehicle is traveling at a speed of 60 km/h or more;
There is a lane in the lane change direction;
The lane as the lane change destination includes a space to which a lane change is possible after 5 seconds;
The type of lane markers indicates that a lane change is permitted;
The radius of curvature of the road is 250 m or more;
The speed of the subject vehicle is slower than the set speed by 5 km/h or more;
The speed of the preceding vehicle is slower than the set speed by 10 km/h or more;
The distance between the subject vehicle and the preceding vehicle is less than a threshold that is preliminarily set based on the speed difference between the subject vehicle and the preceding vehicle; and
The speed of the preceding vehicle present in the lane as the lane change destination satisfies a predetermined condition.

The lane keeping mode in the hands-off mode, which will be described later in detail, refers to a mode in which the autonomous speed control function and the lane keeping function of the autonomous steering control function are being executed and the holding of the steering wheel by the driver is not necessary. The condition that the speed of the preceding vehicle present in the lane as the lane change destination satisfies a predetermined condition is applied differently depending on the type of the lane as the lane change destination. For example, when changing lanes from the left-side lane to the right-side lane on a multi-lane road with left-hand traffic, the condition is that the speed of the subject vehicle present in the left-side lane is higher than the speed of the preceding vehicle present in the right-side lane by about 5 km/h. On the contrary, when changing lanes from the right-side lane to the left-side lane on a multi-lane road with left-hand traffic, the condition is that the speed difference between the subject vehicle and the preceding vehicle in the left-side lane is within about 5 km/h. The conditions regarding the relative speed difference between the subject vehicle and the preceding vehicle are reversed on a right-hand traffic road.

The overtaking assist function serves to turn on the direction indicators to start the LCP when the driver accepts the presentation of the overtaking information and a predetermined overtaking start condition that is preliminarily set is satisfied. Examples of the overtaking start condition include, but are not limited to, a condition in which all of the following conditions are satisfied:

The lane keeping mode is carried out in the hands-on mode;
Hands-on determination is made;
The vehicle is traveling at a speed of 60 km/h or more;
There is a lane in the lane change direction;
The lane as the lane change destination includes a space to which a lane change is possible;
The type of lane markers indicates that a lane change is permitted;
The radius of curvature of the road is 250 m or more;
The speed of the subject vehicle is slower than the set speed by 5 km/h or more (when changing lanes to the right-side lane in a left-hand traffic);
The speed of the preceding vehicle is slower than the set speed by 10 km/or more (when changing lanes to the right-side lane in a left-hand traffic);
The speed of the preceding vehicle present in the lane as the lane change destination satisfies a predetermined condition; and
The elapsed time after the operation of the lane change assist switch 176 is within 10 seconds.

The condition that the speed of the preceding vehicle is slower than the set speed by 10 km/h or more can be changed by the driver's setting, and the set speed after the change represents the overtaking start condition. As the speed that can be changed, for example, 15 km/h and 20 km/h can be selected in addition to 10 km/h. The condition that the speed of the preceding vehicle present in the lane as the lane change destination satisfies a predetermined condition is the same as that in the above-described overtaking proposal condition.

The overtaking assist function serves to start the LCP when the overtaking start condition is satisfied, and also serves to execute the lateral movement to an adjacent lane and the LCM. During the execution of the LCP, the overtaking assist function serves to control the presentation device 16 to present the driver with information indicating that the lane change is performed in an automated or autonomous manner and also serves to call attention to the surroundings. When the LCM is completed, the overtaking assist function is used for turning off the direction indicators and starting the execution of the lane keeping function in the adjacent lane. When the overtaking proposal condition is satisfied again after overtaking the preceding vehicle, the overtaking assist function is used for controlling the presentation device 16 to propose to return to the original lane to the driver. When the driver accepts this proposal by operating the lane change assist switch 176 of the input device 17 and the overtaking start condition is satisfied, the overtaking assist function serves to start the LCP so that the subject vehicle returns to the original lane.

«Route Traveling Assist Function» a. The route traveling assist function serves to control the presentation device 16 to present the route traveling information when there is a traveling direction change point such as a branching point, a merging point, an exit, or a tollgate on the set route, the distance to the traveling direction change point is within a predetermined distance, and a predetermined route traveling proposal condition is satisfied and also serves to propose a lane change to the traveling direction change point. In addition, the route traveling assist function serves to start the LCP when the proposal of the lane change is accepted through the operation of the lane change assist switch 176 and a predetermined route traveling start condition is satisfied. The route traveling assist function is used for determining, based on various travel information items acquired using the travel information acquisition function, whether or not the route traveling proposal condition and the route traveling start condition are satisfied.

When the route is set by the navigation device 15, but the route traveling assist function is not executed or is disabled in the setting, the navigation device 15 executes a normal navigation function that serves to guide the route.

Figure 6:
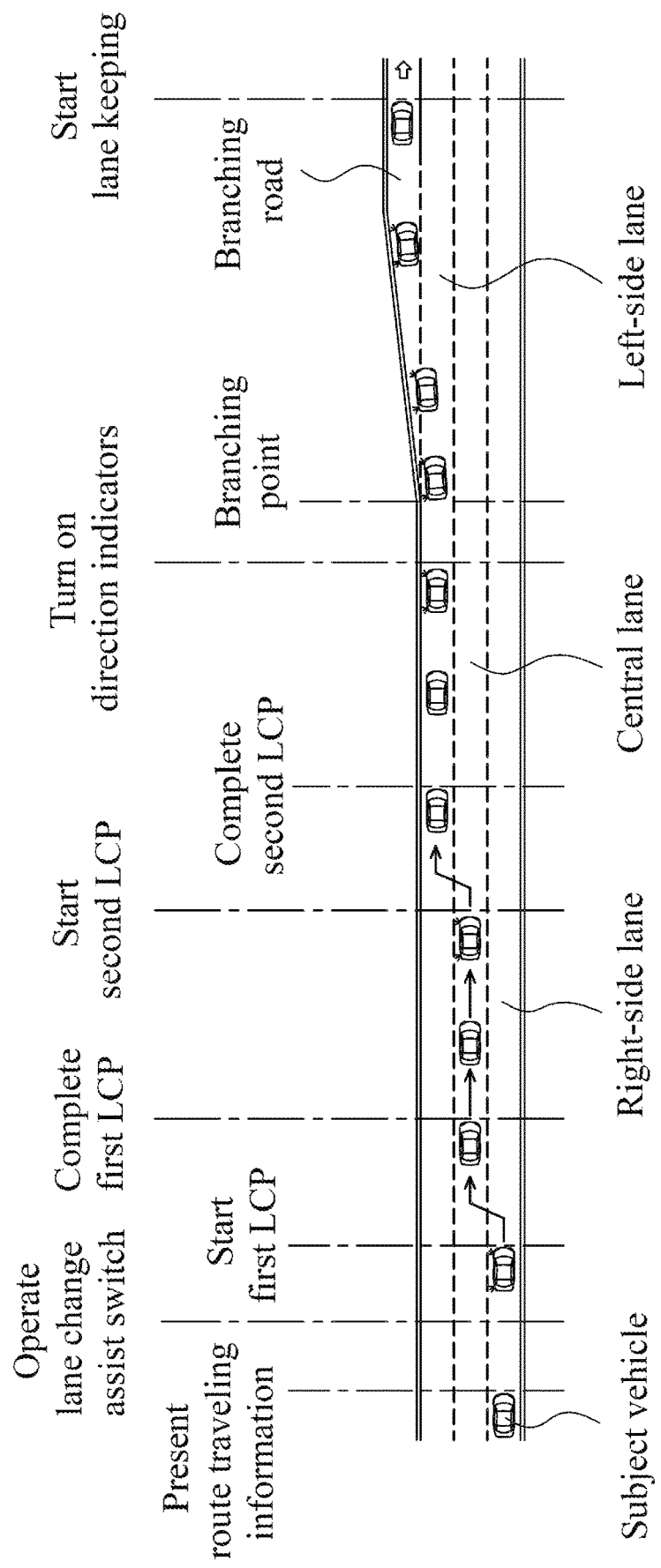
FIG. 6 is a plan view illustrating automated (autonomous) lane change control using a route traveling assist function.

FIG. 6 illustrates an example in which when traveling in the right-side lane on a left-hand traffic road with three lanes on each side, the subject vehicle sequentially changes lanes twice toward a branching point existing in the left-side lane and moves from the branching point to a branching road extending on the left side of the left-side lane. When the location is within a first predetermined distance to the branching point (e.g., about 2.5 km to 1.0 km before the branching point) and the route traveling proposal condition is satisfied, the route traveling assist function serves to propose a lane change from the right-side lane to the central lane based on the route traveling information. The first predetermined distance (also referred to as a lane change proposal section) is preliminarily set in accordance with the number of lane changes required to move to the lane in which the traveling direction change point is present. For example, as illustrated in FIG. 6, when it is necessary to change lanes twice from the right-side lane to the left-side lane via the central lane, the section of 2.5 km to 1.0 km before the branching point represents the first predetermined distance (lane change proposal section).

Examples of the route traveling proposal condition include, but are not limited to, a condition in which all of the following conditions are satisfied:
A destination is set by the navigation device 15;
The lane keeping mode is carried out in the hands-off mode;
The vehicle is traveling at a speed of 60 km/h or more;
There is a lane in the lane change direction;
The type of lane markers indicates that a lane change is permitted; and
The radius of curvature of the road is 250 m or more.

In the route traveling proposal condition, even when the lane as the lane change destination does not include a space to which a lane change is possible, the route traveling information is presented in order to notify the driver that a lane change along the route is necessary.

when the driver accepts the lane change for heading to the branching point and the route traveling start condition is satisfied. Examples of the route traveling start condition include, but are not limited to, a condition in which all of the following conditions are satisfied:
The lane keeping mode is carried out in the hands-on mode;
Hands-on determination is made;
The vehicle is traveling at a speed of 60 km/h or more;
There is a lane in the lane change direction;
The lane as the lane change destination includes a space to which a lane change is possible;
The type of lane markers indicates that a lane change is permitted;
The vehicle is traveling in the lane change proposal section; and
The radius of curvature of the road is 250 m or more.

The route traveling assist function serves to start the LCP when the route traveling start condition is satisfied, and also serves to execute the lateral movement to the central lane and the LCM. When the LCM is completed, the route traveling assist function is used for turning off the direction indicators and starting the execution of the lane keeping function in the central lane. During the execution of the LCP, the route traveling assist function serves to control the presentation device 16 to present the driver with information indicating that the lane change is performed in an automated or autonomous manner and also serves to call attention to the surroundings.

As illustrated in FIG. 6, during the execution of the lane keeping function in the central lane, when the location is within a second predetermined distance to the branching point (e.g., about 2.3 km to 700 m before the branching point) and the route traveling start condition is satisfied, the route traveling assist function is used for turning on the direction indicators to start the second LCP and performing the lane change from the central lane to the left-side lane. When the second LCM is completed, the route traveling assist function is used for turning off the direction indicators and starting the execution of the lane keeping function in the left-side lane.

During the execution of the lane keeping function in the left-side lane, when the location is within a third predetermined distance to the branching point (e.g., about 800 m to 150 m before the branching point) and the route traveling start condition is satisfied, the route traveling assist function serves to turn on the direction indicators. In addition, the route traveling assist function serves to start the autonomous steering control from a point beyond the branching point to the branching road and perform a lane change from the left-side lane to the branching road. When the lane change to the branching road is completed, the route traveling assist function is used for turning off the direction indicators and starting the execution of the lane keeping function in the branching road.

Figure 7:
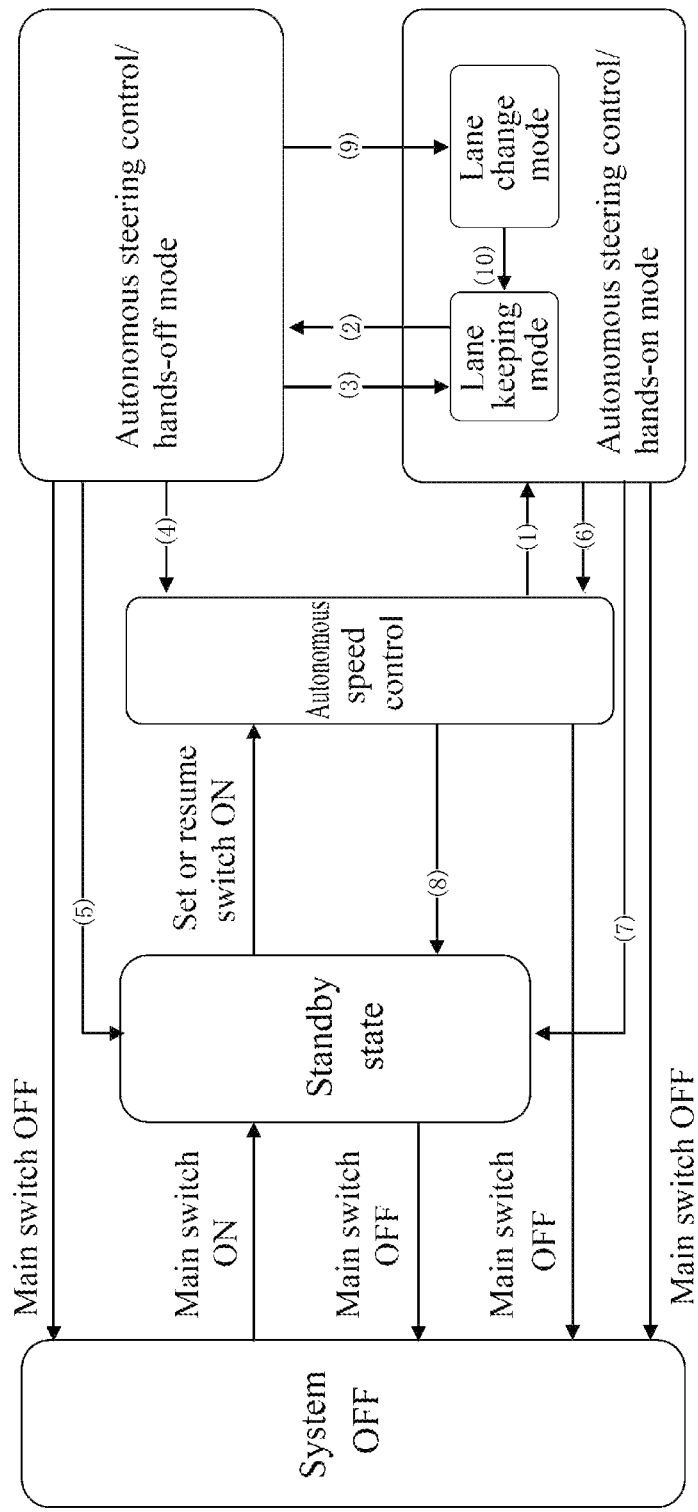
FIG. 7 is a block diagram illustrating a state transition of the control device of FIG. 1.

FIG. 7 is a block diagram illustrating a state transition of each function established in the control device 19. The system illustrated in the figure means an autonomous travel control system realized by the control device 19. When the main switch 171 of FIG. 2 is turned ON from the system OFF state illustrated in the figure, the system comes to a standby state. From this standby state, the autonomous speed control is activated by turning ON the set/coast switch 173 or resume/acceleration switch 172 of FIG. 2. This allows the above-described constant speed control or inter-vehicle distance control to be started, and the driver can drive the subject vehicle simply by operating the steering wheel without stepping on the accelerator or the brake.

During the execution of the autonomous speed control, when the condition (1) of FIG. 7 is satisfied, the mode transitions to the lane keeping mode of the autonomous steering control/hands-on mode. Examples of the condition (1) include, but are not limited to, a condition in which all of the following conditions are satisfied:
Lane markers on both sides of the subject vehicle are being detected;
The driver is holding the steering wheel;
The vehicle is traveling near the center of the lane;
The direction indicators are not operating;
The windshield wiper is not operating at a high speed (HI); and
When a high-precision map is provided, there is not a tollgate, an exit, a merging point, an intersection, or a point at which the number of lanes decreases, within about 200 m ahead.

The hands-on mode refers to a mode in which the autonomous steering control does not operate unless the driver holds the steering wheel, while the hands-off mode refers to a mode in which the autonomous steering control operates even when the driver releases the steering wheel. The holding of the steering wheel by the driver is detected using a touch sensor of the sensors 11.

During the execution of the lane keeping mode of the autonomous steering control/hands-on mode, when the condition (2) of FIG. 7 is satisfied, the mode transitions to the lane keeping mode of the autonomous steering control/hands-off mode. Examples of the condition (2) include a condition in which all of the following conditions are satisfied:
The subject vehicle is traveling on an automobile road;
The vehicle is traveling on a road that is structurally separated from the oncoming lane;
The vehicle is traveling on a road for which a high-precision map is prepared;
The vehicle is traveling at a speed not higher than the speed limit;
GPS signals are effective;
The driver is holding the steering wheel;
The driver is facing forward;
There is not a tollgate, an exit, a merging point, an intersection, or a point at which the number of lanes decreases, within about 800 m ahead;
There is not a sharp curve of 100R or less within about 500 m ahead;
The vehicle is not traveling in a tunnel that exceeds 500 m from the tunnel entrance; and
The accelerator pedal is not depressed.

Whether or not the driver is facing forward is determined, for example, based on an image captured by a driver monitor camera of the sensors 11.

On the contrary, during the execution of the lane keeping mode of the autonomous steering control/hands-off mode, when the condition (3) of FIG. 7 is satisfied, the mode transitions to the lane keeping mode of the autonomous steering control/hands-on mode. Examples of the condition (3) include, but are not limited to, a condition in which any of the following conditions is satisfied:
The subject vehicle is traveling on a road other than an automobile road;
The vehicle is traveling in a two-way traffic section;
The vehicle is traveling on a road for which no high-precision map is prepared;
The vehicle is traveling at a speed higher than the speed limit;
GPS signals can no longer be received;
The driver does not face forward within 5 seconds after a forward gaze alarm is activated;
The driver monitor camera can no longer detect the driver;
There is any of a tollgate, an exit, a merging point, an intersection, or a point at which the number of lanes decreases, within about 800 m ahead;
When traveling at a vehicle speed of less than about 40 km/h, there is a sharp curve of 100R or less within about 200 m ahead;
When traveling at a vehicle speed of about 40 km/h or more, there is a sharp curve of 170R or less within about 200 m ahead;
The vehicle is traveling in a tunnel that exceeds 500 m from the tunnel entrance;
The driver is stepping on the accelerator pedal while holding the steering wheel; and
An approaching alarm is operating.

During the execution of the lane keeping mode of the autonomous steering control/hands-off mode, when the condition (4) of FIG. 7 is satisfied, the autonomous steering control is stopped and transitions to the autonomous speed control. Examples of the condition (4) include, but are not limited to, a condition in which any of the following conditions is satisfied:

Lane markers on both sides of the subject vehicle are no longer detected for a certain period of time;
The driver is operating the steering wheel; and
The windshield wiper is operating at a high speed (HI).

The driver's steering wheel operation is determined by detecting the torque applied to the steering wheel.

During the execution of the lane keeping mode of the autonomous steering control/hands-off mode, when the condition (5) of FIG. 7 is satisfied, the autonomous steering control and the autonomous speed control are stopped and transition to the standby state. Examples of the condition (5) include, but are not limited to, a condition in which any of the following conditions is satisfied:

The driver has operated the brake;
The driver has operated the cancel switch 174 of FIG. 2;
One or more doors of the subject vehicle have opened;
The driver's seat belt has been released;
The seating sensor has detected that the driver is no longer on the driver's seat;
The select lever has come to other than "D" or ""M";
The parking brake has been operated;
The antiskid brake system of the vehicle has been turned OFF;
The antiskid brake system has operated;
The snow mode has been turned ON;
The emergency brake has operated;
The stop state continues for about 3 minutes after the vehicle has stopped due to the vehicle speed control;
The front camera has detected poor visibility such as being unable to correctly recognize an object due to dirt, backlight, rain/fog, or the like;
The front radar has detected shielding or radio disturbance;
The front radar has detected an axis deviation;
The side radar has detected shielding or radio disturbance; and
The side radar has detected an axis deviation.

During the execution of the autonomous steering control/hands-on mode, when the condition (6) of FIG. 7 is satisfied, the autonomous steering control is stopped and transitions to the autonomous speed control. Examples of the condition (6) include, but are not limited to, a condition in which any of the following conditions is satisfied:

Lane markers on both sides of the subject vehicle are no longer detected;
The driver has operated the steering wheel;
The driver has operated the direction indicator lever;
The windshield wiper has operated at a high speed (HI)
The vehicle has come to a tollgate section when a high-precision map is prepared; and
The front camera has detected poor visibility such as being unable to correctly recognize an object due to dirt, backlight, rain/fog, or the like.

During the execution of the autonomous steering control/hands-on mode, when the condition (7) of FIG. 7 is satisfied, the autonomous steering control and the autonomous speed control are stopped and transition to the standby state. Examples of the condition (7) include, but are not limited to, a condition in which any of the following conditions is satisfied:

The driver has operated the brake;
The driver has operated the cancel switch 174 of FIG. 2;
One or more doors of the subject vehicle have opened;
The driver's seat belt has been released;
The seating sensor has detected that the driver is no longer on the driver's seat;
The select lever has come to other than "D" or ""M";
The parking brake has been operated;
The antiskid brake system of the vehicle has been turned OFF;
The antiskid brake system has operated;
The snow mode has been turned ON;
The emergency brake has operated;
The stop state continues for about 3 minutes after the vehicle has stopped due to the vehicle speed control;
The front radar has detected shielding or radio disturbance; and
The front radar has detected an axis deviation.

During the execution of the autonomous speed control, when the condition (8) of FIG. 7 is satisfied, the control transitions to the standby state. Examples of the condition (8) include, but are not limited to, a condition in which any of the following conditions is satisfied:

The driver has operated the brake;
The driver has operated the cancel switch 174 of FIG. 2;
One or more doors of the subject vehicle have opened;
The driver's seat belt has been released;
The seating sensor has detected that the driver is no longer on the driver's seat;
The select lever has come to other than "D" or ""M";
The parking brake has been operated;
The antiskid brake system of the vehicle has been turned OFF;
The antiskid brake system has operated;
The snow mode has been turned ON;
The emergency brake has operated;
The stop state continues for about 3 minutes after the vehicle has stopped due to the vehicle speed control;
The front radar has detected shielding or radio disturbance; and
The front radar has detected an axis deviation.

During the execution of the lane keeping mode of the autonomous steering control/hands-off mode, when the condition (9) of FIG. 7 is satisfied, the mode transitions to a lane change mode of the autonomous steering control/hands-on mode. Examples of the condition (9) include, but are not limited to, a condition in which any of the following conditions is satisfied:

The system has proposed a lane change based on the overtaking assist function or the route traveling assist function and the driver has operated the lane change assist switch 176; and
The driver has operated the direction indicator lever to execute the lane change assist function.

During the execution of the lane change mode of the autonomous steering control/hands-on mode, when the condition (10) of FIG. 7 is satisfied, the mode transitions to the lane keeping mode of the autonomous steering control/hands-on mode. Examples of the condition (10) include, but are not limited to, a condition in which any of the following conditions is satisfied:

The speed limit has been exceeded before the start of the LCP;
The driver has stepped on the accelerator pedal while holding the steering wheel before the start of the LCP;
The LCP can no longer be started within 10 seconds after pressing the lane change assist switch 176 during the proposal of a lane change when there is a slow car ahead;
The LCP can no longer be started and the vehicle has come too close to the branching point after pressing the lane change assist switch 176 during the proposal of a lane change to travel along the route;

The LCM can no longer be started within 5 seconds after the LCP has operated;

The vehicle speed has fallen below about 50 km/h after starting the LCP and before starting the LCM;

There is no longer a space in the adjacent lane required to change lanes after operating the LCP and before starting the LCM;

The driver has performed a cancel operation before starting the LCM;

Lane markers can no longer be detected before starting the LCM;

A determination has been made before starting the LCM that there is no adjacent lane in the direction of changing lanes or there will be no adjacent lane within a certain distance ahead;

A determination has been made before starting the LCM that there is a curve with a radius of curvature of 250 m or more within a certain distance ahead;

A determination has been made before starting the LCM that there is a section within a certain distance ahead in which the type of lane marking prohibits a lane change to the adjacent lane;

The side radar has detected shielding or radio disturbance before starting the LCM;

The side radar has detected an axis deviation before starting the LCM;

The hands-on alarm has operated;

The driver has stopped the direction indicators; and

The LCP has been completed.

The hands-on alarm operates when any of the following conditions is satisfied:

The driver does not hold the steering wheel within about 2 seconds after the LCP has operated;

The driver does not hold the steering wheel within about 2 seconds after pressing the lane change assist switch 176 during the proposal of a lane change when there is a slow car ahead; and The driver does not hold the steering wheel within about 2 seconds after pressing the lane change assist switch 176 during the proposal of a lane change to travel along the route.

The system is turned OFF when the main switch 171 is turned OFF in any of the autonomous steering control/hands-off mode, the autonomous steering control/hands-on mode, the autonomous speed control, and the standby state.

Figure 8:
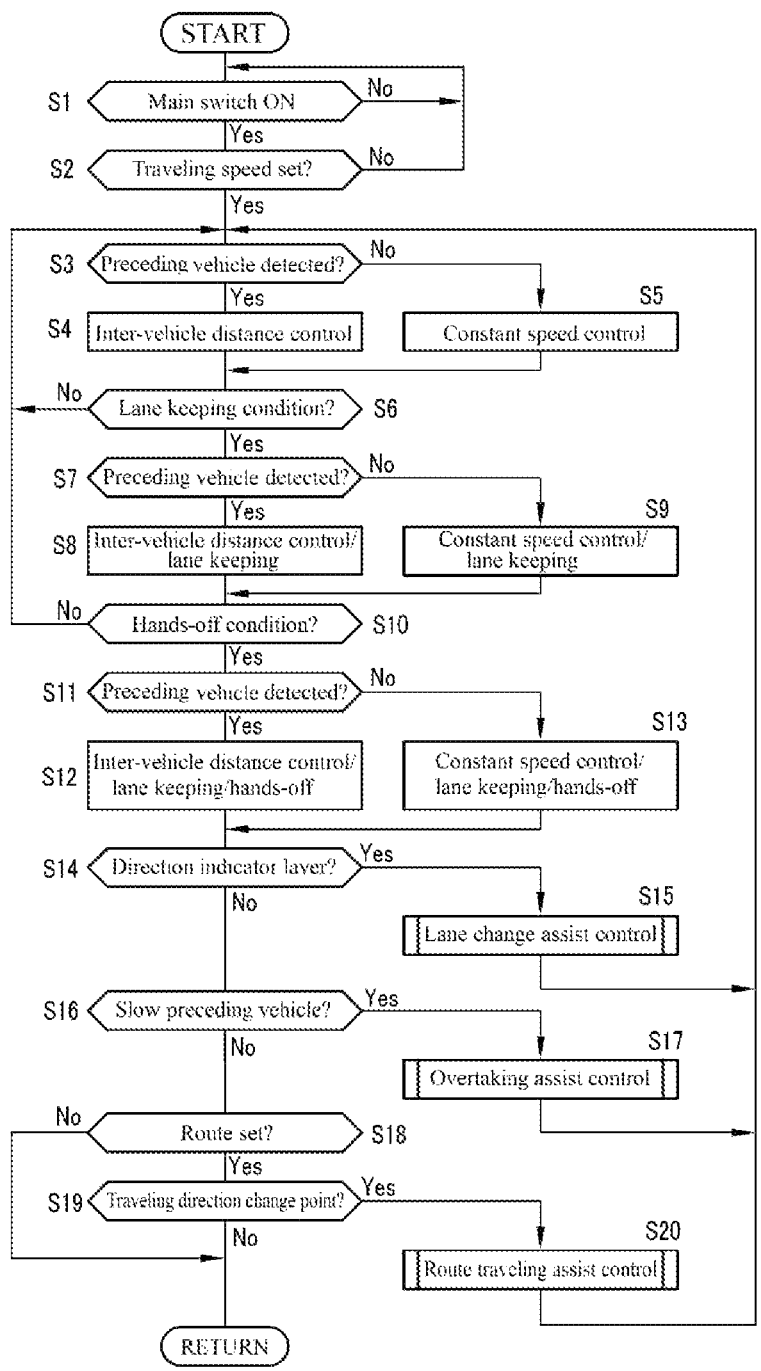
FIG. 8 is a flowchart illustrating a basic travel control process of the travel control apparatus for a vehicle according to the present invention.

The travel control process according to the present embodiment will then be described with reference to FIG. 8. FIG. 8 is a flowchart illustrating the travel control process according to the present embodiment. The control device 19 executes the travel control process, which will be described below, at predetermined time intervals. The following description will be made on the assumption that the control device 19 uses the autonomous travel control function to execute the autonomous speed control and the autonomous steering control and also uses the lane change assist function, the overtaking assist function, and the route traveling assist function to execute the lane change assist control, the overtaking assist control, and the route traveling assist control, respectively.

First, in step S1 of FIG. 8, a determination is made as to whether or not the main switch 171 of the control device 19 is ON, and when the main switch 171 is OFF, step S1 is repeated until the main switch 171 is turned ON. When the main switch 171 is ON, the process proceeds to step S2, in which a determination is made as to whether or not the traveling speed is set by the driver. When the traveling speed is not set, the process returns to step S1, from which steps S1 and S2 are repeated until the traveling speed is set. The setting of the traveling speed is performed by the driver operating the resume/acceleration switch 172 or set/coast switch 173 of the input device 17 illustrated in FIG. 2 to input a desired traveling speed.

When the traveling speed is set, the autonomous speed control is started. In step S3, the front radar (of the sensors 11) which detects an obstacle ahead of the subject vehicle is used to detect whether or not there is a preceding vehicle ahead of the subject vehicle in its traveling lane, and when there is a preceding vehicle, the process proceeds to step S4, in which the inter-vehicle distance control is executed. When there is no preceding vehicle, the process proceeds to step S5, in which the constant speed control is executed. This allows the driver to drive the subject vehicle at a desired speed simply by operating the steering wheel without stepping on the accelerator or the brake.

During the execution of the inter-vehicle distance control in step S4 or the constant speed control in step S5, a determination is made in step S6 as to whether or not the above-described condition (1) for transitioning to the lane keeping mode of the autonomous steering control/hands-on mode is satisfied. When the condition (1) is satisfied, the process proceeds to step S7, while when the condition (1) is not satisfied, the process returns to step S3.

In step S7, the front radar (of the sensors 11) which detects an obstacle ahead of the subject vehicle is used to detect whether or not there is a preceding vehicle ahead of the subject vehicle in its traveling lane. When there is a preceding vehicle, the process proceeds to step S8, in which the inter-vehicle distance control/lane keeping mode is executed. When there is no preceding vehicle, the process proceeds to step S9, in which the constant speed control/lane keeping mode is executed.

During the execution of the inter-vehicle distance control/lane keeping mode in step S8 or the constant speed control/lane keeping mode in step S9, a determination is made in the subsequent step S10 as to whether or not the above-described condition (2) for transitioning to the autonomous steering control/hands-off mode is satisfied. When the condition (2) is satisfied, the process proceeds to step S11, while when the condition (2) is not satisfied, the process returns to step S3. In step S11 in which the condition (2) for transitioning to the autonomous steering control/hands-off mode is satisfied, the front radar (of the sensors 11) which detects an obstacle ahead of the subject vehicle is used to detect whether or not there is a preceding vehicle ahead of the subject vehicle in its traveling lane. When there is a preceding vehicle, the process proceeds to step S12, in which the inter-vehicle distance control/lane keeping mode/hands-off is executed. When there is no preceding vehicle, the process proceeds to step S13, in which the constant speed control/lane keeping mode/hands-off is executed.

In step S14, a determination is made as to whether or not the direction indicator lever has been operated by the driver. When the direction indicator lever has been operated, the condition (9) for transitioning to the lane changing mode of the autonomous steering control/hands-on mode is satisfied, and the process proceeds to step S15. In step S15, the lane change assist control is executed. When the lane change assist control in step S15 is completed, the process returns to step S3. When the direction indicator lever has not been operated by the driver in step S14, the process proceeds to step S16.

In step S16, a determination is made as to whether or not there is a preceding vehicle slower than the set speed. When there is a preceding vehicle slower than the set speed, a determination is made as to whether or not the condition (9) is satisfied, and when the condition (9) is satisfied, the mode transitions to the lane change mode of the autonomous steering control/hands-on mode, and the process proceeds to step S17. In step S17, the overtaking assist control is executed. When the overtaking assist control in step S17 is completed, the process returns to step S3. When there is no preceding vehicle slower than the set speed in step S16, the process proceeds to step S18.

In step S18, a determination is made as to whether a route to the destination is set in the navigation device 15. When no route is set, the process returns to step S1. When a route to the destination is set in the navigation device 15 in step S18, the process proceeds to step S19. In step S19, a determination is made as to whether or not a predetermined distance to the traveling direction change point such as a branching point existing on the route is reached. When the predetermined distance to the traveling direction change point is reached in step S19, a determination is made as to whether or not the condition (9) is satisfied, and when the condition (9) is satisfied, the mode transitions to the lane change mode of the autonomous steering control/hands-on mode, and the process proceeds to step S20. In step S20, the route traveling assist control is executed. When the route traveling assist control in step S20 is completed, the process returns to step S3. When the predetermined distance to the traveling direction change point is not reached in step S19, the process returns to step S1.

In the flowchart of FIG. 8, the necessities of the lane change assist control, the overtaking assist control, and the route traveling assist control are determined in this order, but in practice, the necessities of these control procedures are determined in parallel, and when, during any of the assist control procedures is being executed, it becomes necessary to execute another assist control procedure, the necessity of execution is arbitrated between the assist control procedures, and the assist control to be executed preferentially is determined.

First Embodiment

The description will then be directed to an embodiment for solving a problem that may occur in the basic processing of the travel control described in the flowchart of FIG. 8. In the route traveling assist control of the travel control process described in the flowchart of FIG. 8, for example, when the direction indicator lever is operated by the driver to execute the lane change assist function after the overtaking information is presented using the overtaking assist function, it is not clear which assist function is used to execute the lane change. In addition, when the direction indicator lever is operated by the driver to execute the lane change assist function after the driver's acceptance input as for the overtaking information, it is not clear which assist function is used to execute the lane change. Thus, when the overtaking assist function and the lane change assist function are executed at the same time and it is not clear which function is used to perform the lane change, the driver's intention to change lanes is not properly reflected.

Figure 9:
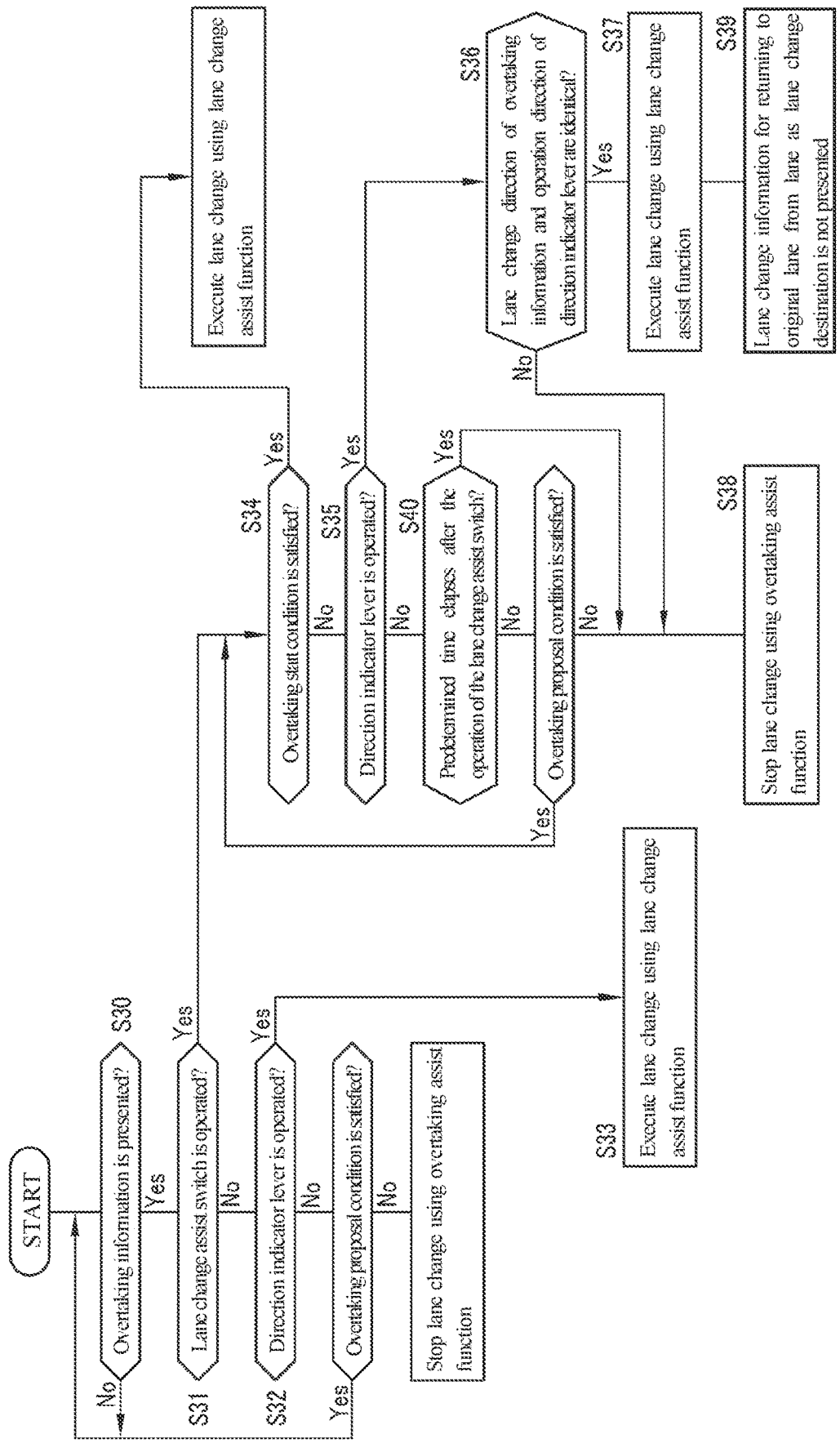
FIG. 9 is a flowchart illustrating a travel control process of the travel control apparatus for a vehicle according to the first embodiment.

In the present embodiment, to prevent the occurrence of the above-described problem, control as in the flowchart illustrated in FIG. 9 is performed. When the overtaking information is presented using the overtaking assist function in step S30 and the direction indicator lever is operated in step S32 without the acceptance input as for the overtaking information in step S31, the lane change is executed using the lane change assist function in step S33. Through this operation, the driver's intention to change lanes is prioritized.

When the direction indicator lever is operated in step S35 after the acceptance input as for the overtaking information is performed in step S31 and before the overtaking start condition is satisfied in step S34, the process proceeds to step S36. In step S36, a determination is made as to whether or not the lane change direction in the overtaking information and the operation direction of the direction indicator lever are the same. When the lane change direction in the overtaking information and the operation direction of the direction indicator lever are the same, the process proceeds to step S37, in which the lane change is executed using the lane change assist function as substitute for the lane change using the overtaking assist function. This allows the driver's intention to be prioritized. In this case, the driver's intention to change lanes is prioritized, and in step S39, the lane change information for returning from the lane as the lane change destination to the original lane is not presented.

On the contrary, when the lane change direction in the overtaking information and the operation direction of the direction indicator lever are not the same in step S36, a determination is made that the acceptance input has been canceled, and in step S38, the lane change using the overtaking assist function is stopped.

When the direction indicator lever is not operated in step S35 and a predetermined time elapses after the operation of the lane change assist switch in step S40, the lane change using the overtaking assist function is stopped in step S38. This predetermined time may be a predetermined threshold or may otherwise be changed based, for example, on the reason why the overtaking assist function is executed. For example, when overtaking a preceding vehicle because the speed of the preceding vehicle is slow, the predetermined time is set to about 10 seconds, and when the lane change is required to proceed along the route using the route traveling assist function, the predetermined time is about 2 minutes and 30 seconds or the like.

As described above, according to the travel control apparatus 1 and travel control method for a vehicle of the present embodiment, the system trigger mode and the driver trigger mode are provided. In the system trigger mode, when a predetermined condition for executing a lane change is satisfied, the driver is presented with lane change information as to whether or not to accept execution of an automated lane change function for the vehicle to perform the lane change by autonomous travel control, and when the driver's acceptance input of accepting the execution of the automated lane change function is detected in response to presentation of the lane change information, the automated lane change function is executed. In the driver trigger mode, when a lane change instruction operation different from the acceptance input is performed by the driver, the automated lane change function is executed. When the lane change instruction operation is performed by the driver after the presentation of the lane change information, the automated lane change function by the driver trigger mode is executed. Through this operation, even when there is a proposal of a lane change by the system trigger mode, the driver's intention to change lanes is prioritized and the automated lane change function by the driver trigger mode can be executed.

According to another aspect, the system trigger mode and the driver trigger mode are also provided. In the system trigger mode, when a predetermined condition for executing a lane change is satisfied, the driver is presented with lane change information as to whether or not to accept execution of an automated lane change function for the vehicle to perform the lane change by autonomous travel control, and when the driver's acceptance input of accepting the execution of the automated lane change function is detected in response to presentation of the lane change information, the automated lane change function is executed. In the driver trigger mode, when a predetermined lane change instruction operation different from the acceptance input is performed by the driver, the automated lane change function is executed. In the case in which the lane change instruction operation is performed after the driver's acceptance input, when a lane change direction presented by the lane change information and a lane change direction instructed by the lane change instruction operation are an identical direction, the automated lane change function by the driver trigger mode is executed as substitute for the automated lane change function by the system trigger mode. On the other hand, when the lane change direction presented by the lane change information and the lane change direction instructed by the lane change instruction operation are opposite directions, the acceptance input is canceled. Through this operation, even when the driver accepts the proposal of a lane change by the system trigger mode, the driver's intention to change lanes is prioritized and the automated lane change function by the driver trigger mode can be executed.

When the automated lane change function by the driver trigger mode is executed as substitute for the automated lane change function by the system trigger mode, the presentation of the lane change information for returning to the original lane from the lane as the lane change destination may not be performed, and therefore the driver's intention to change lanes can be prioritized to continue to travel in the lane as the lane change destination.

Moreover, an operation unit that can be operated while the driver is holding the steering wheel may be used for the acceptance input, and a direction indicator lever may be used for the lane change instruction operation; therefore, the operation is possible while clearly separating the acceptance for the system trigger mode and the lane change based on the driver's intention, and it is possible to prevent the occurrence of erroneous operation.

DESCRIPTION OF REFERENCE NUMERALS

1 Travel control apparatus
11 Sensors
12 Subject vehicle position detection device
13 Map database
14 Onboard equipment
15 Navigation device
16 Presentation device
17 Input device
171 Main switch
172 Resume/acceleration switch
173 Set/coast switch
174 Cancel switch
175 Inter-vehicle distance adjustment switch
176 Lane change assist switch
177 Display screen
178 ON button
179 OFF button
18 Drive control device
19 Control device

The invention claimed is:

1. A travel control method for a vehicle having a system trigger mode and a driver trigger mode, the system trigger mode being a mode in which a lane change proposed from an autonomous travel control system of the vehicle is executed by autonomous travel control using an automated lane change function, the driver trigger mode being a mode in which a lane change instructed from a driver of the vehicle is executed using the automated lane change function, the system trigger mode comprising:
  determining whether or not a start condition for the automated lane change function is satisfied;
  when the start condition is satisfied, presenting lane change information as to whether or not to perform the lane change; and
  when an acceptance input of accepting to perform the lane change is detected in response to presentation of the lane change information, using the automated lane change function to execute the lane change proposed in the lane change information,
the driver trigger mode comprising:
  detecting whether or not a lane change instruction operation different from the acceptance input is performed by the driver; and
  when detecting that the lane change instruction operation is performed, using the automated lane change function to execute the lane change instructed by the lane change instruction operation,
  wherein when the lane change instruction operation by the driver is detected after the lane change information is presented in the system trigger mode, the driver trigger mode is used to execute the lane change instructed by the lane change instruction operation.

2. The travel control method for a vehicle according to claim 1, wherein
  a switch that can be pressed while a steering wheel is being held is used for the acceptance input, and
  a direction indicator lever is used for the lane change instruction operation.

3. A travel control method for a vehicle, comprising:
  providing a system trigger mode and a driver trigger mode,
    the system trigger mode including, when a start condition for an automated lane change function of performing a lane change of a vehicle by autonomous travel control is satisfied, presenting lane change information as to whether or not to accept execution of the automated lane change function, and when an acceptance input of accepting the execution of the automated lane change function is detected in response to presentation of the lane change information, executing the automated lane change function,
    the driver trigger mode including executing the automated lane change function when a predetermined lane change instruction operation different from the acceptance input is performed;
  when the predetermined lane change instruction operation is performed after the acceptance input, determining whether or not a lane change direction presented by the lane change information and a lane change direction instructed by the predetermined lane change instruction operation are an identical direction;
  when the lane change direction presented by the lane change information and the lane change direction instructed by the predetermined lane change instruction operation are the identical direction, executing the automated lane change function by the driver trigger mode as substitute for the automated lane change function by the system trigger mode; and when the lane change direction presented by the lane change information and the lane change direction instructed by the predetermined lane change instruction operation are opposite directions, canceling the acceptance input.

4. The travel control method for a vehicle according to claim 3, wherein the automated lane change function by the system trigger mode includes an overtaking assist function of overtaking a preceding vehicle slower than the vehicle, and when the automated lane change function by the driver trigger mode is executed as substitute for the automated lane change function by the system trigger mode, the presentation of the lane change information for returning to an original lane from a lane as a lane change destination is not performed.

5. The travel control method for a vehicle according to claim 3, wherein
   a switch that can be pressed while a steering wheel is being held is used for the acceptance input, and
   a direction indicator lever is used for the predetermined lane change instruction operation.

6. A travel control apparatus for a vehicle having a system trigger mode and a driver trigger mode, the system trigger mode being a mode in which a lane change proposed from an autonomous travel control system of the vehicle is executed by autonomous travel control using an automated lane change function, the driver trigger mode being a mode in which a lane change instructed from a driver of the vehicle is executed using the automated lane change function, the travel control apparatus comprising:
   a condition determination unit configured to determine whether a start condition for the automated lane change function is satisfied;
   a presentation unit configured to, when the start condition is satisfied, present lane change information as to whether or not to perform the lane change;
   an acceptance input unit to which an operation of accepting to perform the lane change is performed in response to presentation of the lane change information;
   a lane change instruction unit with which a lane change instruction operation different from that for the acceptance input unit is performed, the lane change instruction unit being operated by the driver; and
   a control unit configured to switch between a system trigger mode of using the automated lane change function to execute the lane change proposed by the lane change information when detecting the operation of the acceptance input unit and a driver trigger mode of using the automated lane change function to execute the lane change instructed by the lane change instruction unit when detecting the operation of the lane change instruction unit,
wherein when the operation of the lane change instruction unit by the driver is detected after the lane change information is presented in the system trigger mode, the driver trigger mode is used to execute the lane change instructed by the lane change instruction unit.

* * * * *